United States Patent [19]

Lentz et al.

[11] Patent Number: 5,382,441
[45] Date of Patent: Jan. 17, 1995

[54] METHOD OF PROCESSING FOOD UTILIZING INFRARED RADIATION

[75] Inventors: Ronald R. Lentz, Wayzata; Peter S. Pesheck, Brooklyn Center; George R. Anderson, Minneapolis; Jimmy DeMars, Hugo; Thomas R. Peck, Vadnais Heights, all of Minn.

[73] Assignee: The Pillsbury Company, Minneapolis, Minn.

[21] Appl. No.: 49,265

[22] Filed: Apr. 16, 1993

[51] Int. Cl.$^6$ ............................................. A21D 6/00
[52] U.S. Cl. .................... 426/241; 426/243; 426/496
[58] Field of Search .................... 426/241, 243, 496

[56] References Cited

U.S. PATENT DOCUMENTS

| | | | |
|---|---|---|---|
| 2,340,354 | 2/1944 | Wells | 107/54 |
| 3,037,443 | 6/1962 | Newkirk et al. | 99/332 |
| 4,170,659 | 10/1979 | Totino et al. | 426/95 |
| 4,526,801 | 7/1985 | Atwell | 426/128 |
| 4,612,198 | 9/1986 | Wallin et al. | 426/94 |
| 4,792,456 | 12/1988 | Katz et al. | 426/551 |
| 4,917,914 | 4/1990 | Katz et al. | 426/551 |
| 5,036,179 | 7/1991 | Westerberg et al. | 219/411 |
| 5,049,711 | 9/1991 | August | 426/241 |
| 5,094,865 | 3/1992 | Levinson | 426/243 |

FOREIGN PATENT DOCUMENTS

| | | |
|---|---|---|
| 2144956A | 8/1983 | United Kingdom . |
| 2132060A | 6/1984 | United Kingdom . |
| 2147787B | 4/1987 | United Kingdom . |
| 2147788B | 4/1987 | United Kingdom . |
| 2147789B | 4/1987 | United Kingdom . |
| 455727 | 3/1975 | U.S.S.R. . |

OTHER PUBLICATIONS

Biscuit Baking by Near-infrared Radiation, Peter Wade, 1987.
Infra-Red Radiation for Food Processing II. Calculation of Heat Penetration During Infra-Red Frying of Meat Products, Magnus Dagerskog, 1979.
Infra-Red Radiation for Food Processing I. A Study of the Fundamental Properties of Infra-Red Radiation, M. Dagerskog et al., 1979.
Optical Properties of Bread in the Near-Infrared Range, C. Skjoldebrand et al., 1988.
Baking Using Short Wave Infra-Red Radiation, Christina Skjoldebrand and Claes-Goran Andersson.
Drying by Infra-Red Radiation, A. Shuman et al., 1950.
Reflectance Spectroscopy, W. Wendlandt et al., p. 9, line 22 et seq., 1966.

*Primary Examiner*—George Yeung
*Attorney, Agent, or Firm*—Kinney & Lange

[57] ABSTRACT

The present invention includes a method of selectively heating, comprising the step of providing a source of radiation capable of delivering at least 60% of its power in a selected wavelength band, and exposing the food to the radiation for an amount of time sufficient to heat beneath a surface.

13 Claims, 9 Drawing Sheets

METHOD OF PROCESSING FOOD UTILIZING INFRARED RADIATION

BACKGROUND OF THE INVENTION

The present invention relates to a method of processing food. In particular, the present invention relates to a method of processing food by means of exposure to a selected band of infrared radiation which heats an interior of the food without substantially browning the exterior surfaces.

The term "processing" for purposes of this disclosure includes all forms of cooking including: baking, thawing, proofing, deep heating, and selectively thawing, for example.

The use of infrared radiation to cook dough is known. "Infrared Radiation" hereinafter referred to as IR radiation, for purposes of this disclosure includes electromagnetic radiation in the wavelength range from 760 to 10,000 nanometers. The use of IR radiation to cook foods offers several advantages over conventional baking.

Devices which emit IR radiation do not heat the air in the oven between the radiator and the product to be baked. Better process control is possible by using IR radiation to cook food, as compared to conventional baking.

Baking times can be faster with short wave radiation as compared to conventional baking. For products of less than a centimeter in thickness, short wave radiation generally cooks foods faster than conventional baking. A portion of the radiation in the IR wavelength range penetrates the surface of the food to be cooked, and heats the interior of the food. In contrast, with conventional cooking, the exterior surfaces of the food are heated, and the remainder of the food is heated by means of conduction from the exterior surfaces. Consequently, food baked by means of IR radiation typically reaches the selected final temperature faster than baking in a conventional oven.

It has been found that dough based products baked by means of IR radiation have better textural qualities, have a thinner crust and a finer crumb structure which are characteristics that are desirable to consumers.

It is known in the art that when making a determination as to whether to use IR radiation to heat food, it is necessary to first determine which wavelength band is most efficiently absorbed by food being heated. The selection of the wavelength band depends upon the infrared characteristics of the material being heated. For example, the deepest heating beneath the surface for bread crumb and crust occurs with radiation in a wavelength range between about 800 and about 1250 nanometers. A penetration depth of 3.8 millimeters for crumb and 2.5 millimeters for crust was measured at a wavelength band between 800 and 1,250 nanometers. C. Skjoldebrand et al., *Optical Properties of Bread in the Near-Infrared Range*, 8 J. Food Engineering (1988), pages 129, 137.

Once the favorable wavelength range to obtain the desired results has been determined, a source with a temperature giving a peak output in this range is selected. For a blackbody radiator which operates at about a 3200K source temperature, the wavelength spectrum includes radiation between about 300 nanometers and extends beyond 4,000 nanometers. Only the fraction of the radiation which falls into the range between 800 and 1,300 nanometers is effective in heating beneath the food surface. It is estimated that at best, only about 35% of radiation emitted from a 3,200K source radiator actually serves the purpose of efficiently deep heating the food product. The remaining radiation heats the surface of the food and results in browning or is reflected. Depending on the results desired, browning may be undesirable. For example, if the object of heating is to cook a bakery product which the consumer browns at home shortly before serving the product, then it is undesirable to brown concurrently with deep heating during manufacture.

A quartz halogen bulb with a tungsten filament has been determined to deliver at most 35% of its radiation between 800 and 1300 nanometers, and has a peak intensity of about 1,000 nanometers. The balance of the radiation is either below 800 nanometers, or above 1300 nanometers.

Exposing dough to IR radiation from a source such as a quartz halogen lamp with a tungsten filament deep heats the interior of the dough products most efficiently with radiation between about 800 and about 1,300 nanometers. Radiation at wavelengths longer than 1,300 nanometers heats the surface of the dough products. If the processing technique includes completely baking a dough product such as bread, the surfaces of the bread become browned by the time the product is completely cooked.

Before the present invention, food processes using IR radiators have been controlled by changing the source temperature which shifts radiant power and the wavelength distribution curve. Upon lowering source temperature, a lesser amount of heating beneath the dough product surface occurs and a relatively greater amount of surface heating occurs. When less surface heating is desired, the temperature of the radiator is increased. A relatively greater portion of shorter wavelength radiation is delivered which is more capable of penetrating into the dough product.

Heated bodies which are the source of infrared radiation radiate energy simultaneously over a wide range of wavelengths. Adjusting the temperature of the source provides only limited control of the fraction of the total power radiated in the 800 to 1,300 nanometer deep heating wavelength band. At best, about 35% of the total power radiated lies in this band.

For this reason, controlling both surface heating and deep heating of a food product by means of changing the source temperature of the radiator does not provide for good process control as the surface of the food product is heated and browned before the interior is sufficiently heated.

Although IR radiation has before the present invention been a valuable method of heating dough-based and other food products, its use is limited to processes which require that the final product be surface browned.

The use of IR radiation to proof dough has been described in the art. Katz U.S. Pat. No. 4,917,914 describes a method of proofing dough which includes the process step of exposing 0.63 centimeter thick dough pieces prior to being placed in cans to high intensity radiant heaters with current density [sic] up to 20 Watts/inch$^2$. It is assumed that the author was referring to "watt density", or "total radiant exitance", rather than current density. Using the Stefan-Boltzmann law, and Planck's law, the source spectrum can be estimated.

At 20 watts per square inch, the heater temperature and wavelength of the radiator used to generate the data in the Katz 4,917,914 reference, assuming blackbody radiation, has a source temperature around 870K and has a peak wavelength at about 3,300 nanometers.

Even if the selected radiator did not emit blackbody radiation, the maximum intensity would still be in the same range. For anodized aluminum, the maximum intensity was calculated to occur at about 2,800 nanometers. For oxidized steel, the maximum intensity occurred at about 3,200 nanometers, and with Incoloy 800 ™, the maximum intensity occurred at about 3,230 nanometers. For each of these sources, most of the radiated power lies between about 1,500 to 10,000 nanometers.

From published data, water is highly absorbing in this spectral long wavelength range and so only surface heating occurs. Radiation in this range is known to brown the outer surfaces of the dough during proofing, which is undesirable in a refrigerated dough product.

Devices which simultaneously emit IR and visible radiation are common. Westerberg et al. U.S. Pat. No. 5,036,179 describes an oven employing tungsten light bulbs or arc lamps capable of producing 1,500 watts of radiant energy in the 400–4,500 nanometer range with a peak intensity at about 1,000 nanometers. This type of radiator effectively cooks and browns food in less time than when using IR radiation alone, or when using convection or conduction ovens.

A significant portion of the spectrum described in the Westerberg 5,036,179 reference is in the range of 400 to 700 nanometers. This reference describes the use of a quartz halogen lamp producing 10% of the output in the 400–700 nanometer range.

Katz U.S. Pat. No. 4,792,456 describes a similar method except that the dough is sealed in the containers prior to heating, and a "no-convection" tunnel or a jet sweep oven is used to heat the cans until an internal dough temperature of approximately 302K is achieved.

The use of IR radiation to bake biscuits is also known. U.K. Patent 2,147,787 to Wade describes the use of IR radiation having an intensity peak between 720 and 2,000 nanometers to bake biscuits. IR radiation is used to completely bake the biscuits. The biscuits are then rapidly cooled and packaged. Biscuits prepared in this manner do not experience spontaneous breakage after cooling and packaging. Since the biscuits are fully baked according to the described process, browning must occur upon exposure to the selected radiation source.

In U.K. Patent 2,147,789 B to Wade, a method of biscuit manufacture is described which includes exposing biscuit dough to grey body radiation within the wavelength range of 720 to 2,000 nanometers, the wavelength band having a maximum intensity at a wavelength which is not preferentially absorbed by water. Preferred maximum intensity is between 1,000 and 1,200 nanometers. Such exposure completely cooks the biscuit and browning occurs due to the presence of radiation in the 2,000 nanometer wavelength range.

With both U.K. Patents 2,147,788 B and 2,147,789, the radiators described are broadband grey body radiators whose temperature is chosen to produce maximum intensity between 800 and 1,500 nanometers. However, only about 45% of the energy delivered is in the preferred wavelength band. Heaters with temperatures in the 1,923K to 3,673K range meet these requirements.

The use of IR radiation to bake bread loaves has also been described in Wells U.S. Pat. No. 2,340,354. Drying lamps are heated to a temperature at which the filaments are incandescent and will emit infrared or combined infrared and other rays. Page 1, col. 2, lines 24–30. Exposing dough to such a radiation source completely cooks the dough product, including forming a brown crust.

Devices which utilize halogenated lamps as a source of I.R. radiation are known. U.K. Patent Applications 2 144,956A and 2 132,060A show a cook-top heating device with a plurality of halogenated lamps for delivering IR radiation to foods. The '956A patent describes a radiator having a maximum wavelength of 1,200 nanometers and having a wavelength band within the IR range. The reference describes the use of an optical filter to block out undesirable visible light. Pg. 3, lines 62–65. Visible light has a wavelength range below the IR range.

It is known to use IR radiation to heat prepared food just prior to serving as described in Newkirk U.S. Pat. No. 3,037,443. Prepared foods such as sandwiches are wrapped in material transparent to radiation of wavelengths between 1,500 and 3,000 nanometers and are placed in a device which emits IR radiation in this range. Three minutes of exposure is sufficient to brown the bread and thoroughly heat the entire product.

SUMMARY OF THE INVENTION

A method of heating food by means of radiation is described. The method includes the steps of selecting a source of radiation suitable for deep heating food, wherein at least 60% of the power is delivered in a wavelength band capable of deep heating.

The method also includes the step of exposing the food to the radiation for a time sufficient to heat an interior of the food to a selected temperature. Preferably, the food is exposed to radiation in the IR range but below about 1,300 nanometers. Most preferably, a dough product is exposed to radiation between about 800 and about 1,300 nanometers. The present method may be used for any heating process such as cooking, frying, thawing, drying, proofing, suppressing microbial growth and the like.

DETAILED DESCRIPTION OF THE PREFERRED EMBODIMENTS

Figure 1:
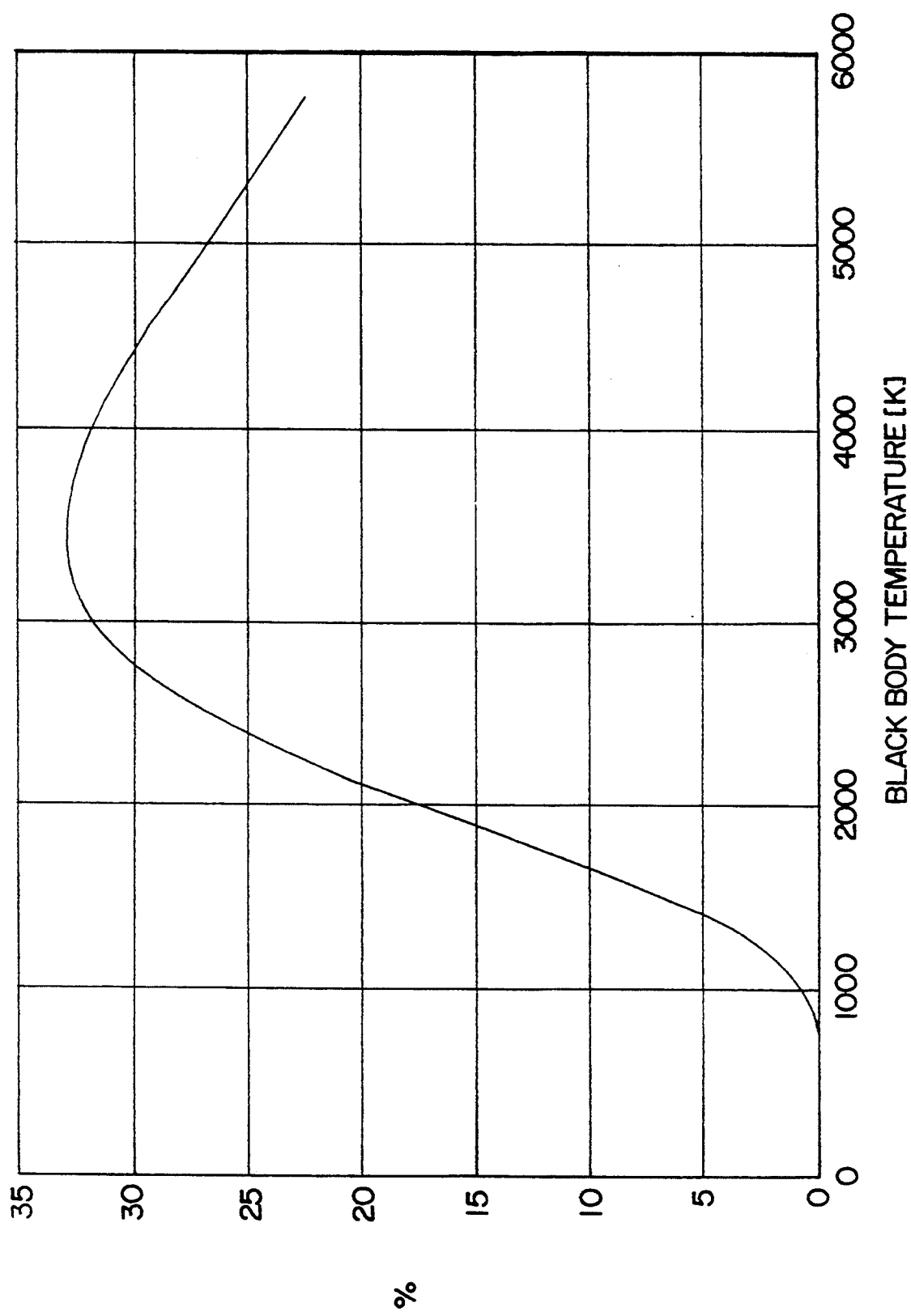
FIG. 1 is a graph of the percentage of the total radiated power that lies between 800 and 1,300 nanometers versus blackbody temperature.

The present invention is a method of heating food to effect heating predominantly beneath the surface by means of exposure to a selected band of IR radiation capable of delivering at least 60% of its power beneath the surface of the food.

The optical characteristics of the food are first measured by observing the visible and near IR spectra of the food being studied. Using the Kubelka-Munk theory as described in *Reflectance Spectroscopy* by W. Wendlandt and H. Hecht, Interscience Publishers, NY, 1966, p. 59-61, the absorption index "K" and the scattering index "S" are measured, and a wavelength dependent penetration depth "$\delta_p$" is calculated from the K and S values according to the following equation:

(1) $\delta_p = 1/(K(K+2S))^{\frac{1}{2}}$

K and S have the dimensions of reciprocal length.

"Penetration depth" for purposes of this disclosure is the depth where 37% of the incident radiation remains unabsorbed.

Preferably, a dough product is exposed to IR radiation in the range of 800 to 1,300 nanometers for an amount of time to heat the food to a desired temperature. By delivering a substantial portion of the power below the food surface, deep heating occurs, while surface heating is greatly reduced.

Despite the several advantages to cooking food products with IR radiation, known methods lack the flexibility which could improve the quality of current products, and make entirely new products possible. It has been recognized by the present inventors that it would be desirable to have greater flexibility in cooking food products by means of IR radiation. For example, it might be desirable to cook one surface more than another surface of a food product as in the case of pizza crusts, and it would be desirable in other instances to heat or completely cook food products without causing the outer surfaces to brown. In still other instances, it might be desirable to cook an interior of a food product for a greater amount of time prior to the onset of browning to allow a filling to heat thoroughly before the exterior of the baked product browns.

For example, some food based products are sold for further heating in a toaster. Such products are fully cooked, but are either not brown at all or are slightly browned. The products as they are sold should not be brown because when placed in a toaster oven, the products become even more browned. If the products become too dark, the product is visually less appealing to the customer, or there is a corresponding reduction in flavor qualities.

It was surprisingly discovered that by selecting a band of radiation which enhances heating beneath the surface, the interior of the food was heated to a desired internal temperature without overheating the exterior surfaces. Preferably, radiation above 1,300 nanometers and below 800 nanometers is predominantly blocked out. To greatly decrease surface heating it is more critical to remove the longer wavelength radiation than it is to remove the shorter wavelength radiation.

What is meant by "predominantly" is that although the means for removing such radiation above 1,300 nanometers and below 800 nanometers as described in this application is highly effective, no known means for removing radiation of selected wavelengths is perfect, and therefore small amounts of power in undesirable wavelength ranges may be present.

It is estimated that by removing power above 1,300 nanometers, approximately twice the energy can be delivered to the food without causing excessive surface heating as compared to exposure of the food to the same IR radiation source without removing power above 1,300 nanometers.

FIG. 1 shows the percentage of the total radiated power, that lies between 800 and 1,300 nanometers versus blackbody temperature. As can be seen from FIG. 1, a maximum of about 35% of the total output lies in the desired 800 to 1,300 nanometer band. This maximum occurs for a source temperature of about 3200K.

As described above, a known prior art method for controlling IR processing includes changing the source temperature. For example, if more surface heating is desired, then the source temperature is decreased. By selecting a radiator source temperature of 1000K, significantly less than 5% of the radiated power lies in the deep heating band. The balance of the infrared power is dissipated near the surface.

It was surprisingly discovered that better control in IR processing can be achieved by eliminating radiation which heats near the surface of the food, such as by filtering out the unwanted radiation.

The most preferred method of filtering out unwanted radiation above 1,300 nanometers includes positioning a water filter between the radiation source and the object to be heated. Preferably, the radiation source is a quartz halogen bulb operated at about 1,500 watts. A reflector preferably is positioned on a side of the bulb opposite the side facing the food to be cooked. Such a radiation source is readily available and can be purchased from General Electric Lighting Division, Cleveland, Ohio. This bulb has an apparent temperature of about 3,200K.

Although the use of only one radiation source has been described, it is to be understood that multiple bulbs may be used at the same time to provide a uniform distribution of radiation and to provide sufficient source radiation to heat more than one product at a time. Furthermore, the present invention contemplates the use of alternate IR radiation sources such as arc lamps and lasers for example.

Although it was discovered that the technology described in this disclosure has applicability to dough based products such as biscuits, pastries and the like, it has been discovered that selectively delivering IR radiation in a band between 800 and about 1,300 nanometers can affect deep heating in many other foods, including ice cream, potatoes and virtually any other food which does not strongly absorb visible radiation. The only apparent limitation is the depth in which the power penetrates.

Figure 2:
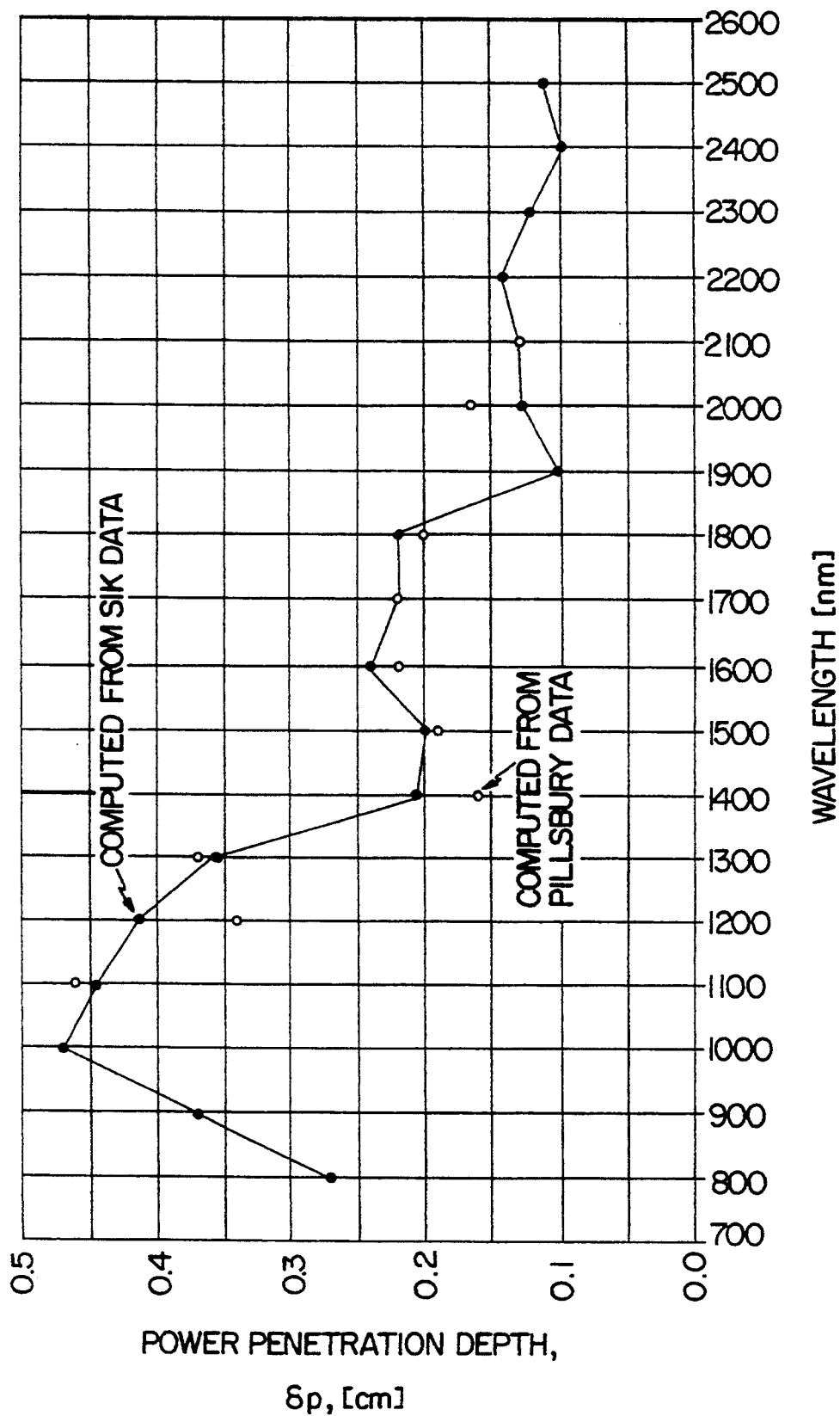
FIG. 2 is a graph of power penetration depth versus wavelength for white bread crumb.

FIG. 2 is a graph of penetration depth versus wavelength for white bread crumb. A portion of the data was generated for purposes of this disclosure, and a portion (referred to in the graph as SIK data) was calculated from published data. As shown in FIG. 2, the maximum penetration occurs at about 1,000 nanometers, and the depth of penetration corresponding to the maximum is about 0.47 centimeters. It can also be seen that at above about 1,300 nanometers, the penetration depth drops off sharply. At wavelengths of about 1,900 nanometers and above, surface heating occurs.

Figure 3:
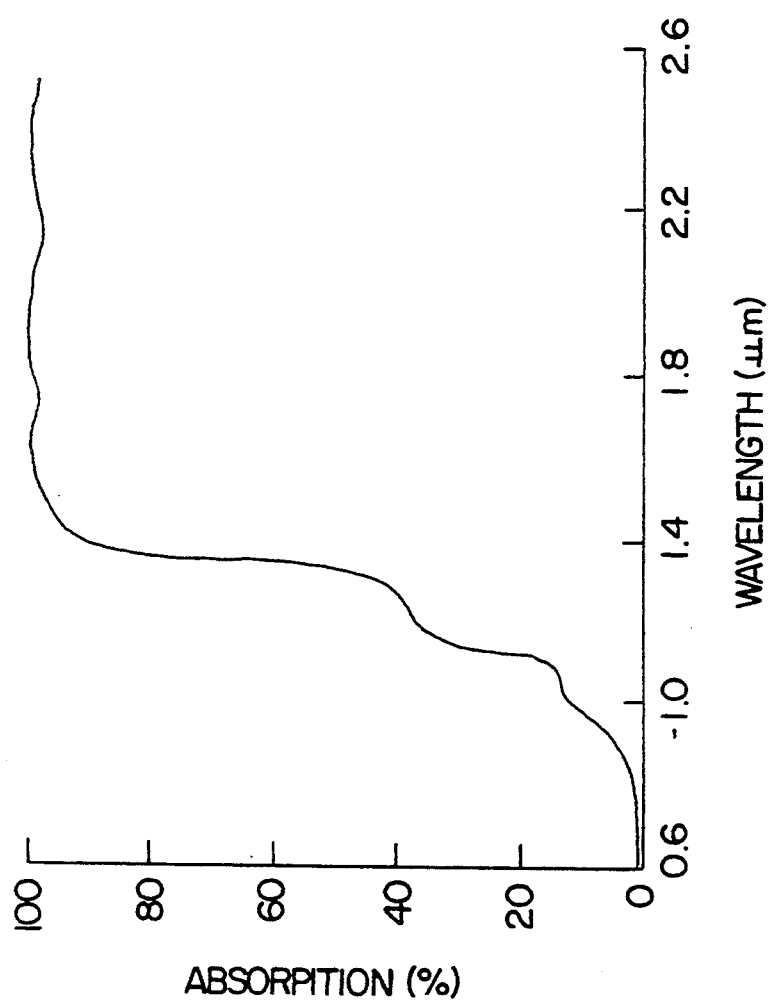
FIG. 3 is a graph showing the IR radiation absorption characteristics of water.

FIG. 3 is a graph of the absorption of IR radiation by a 3 millimeter thick layer of water. As shown in this Figure, about 1,250 nanometers defines a border between high and low absorption. Above about 1,300 nanometers, substantially all of the radiation is absorbed into the water. Placing such a filter between the preferred radiation source and the food to be heated therefore selectively eliminates all of the IR radiation delivered to the food above about 1,300 nanometers.

Figure 4:
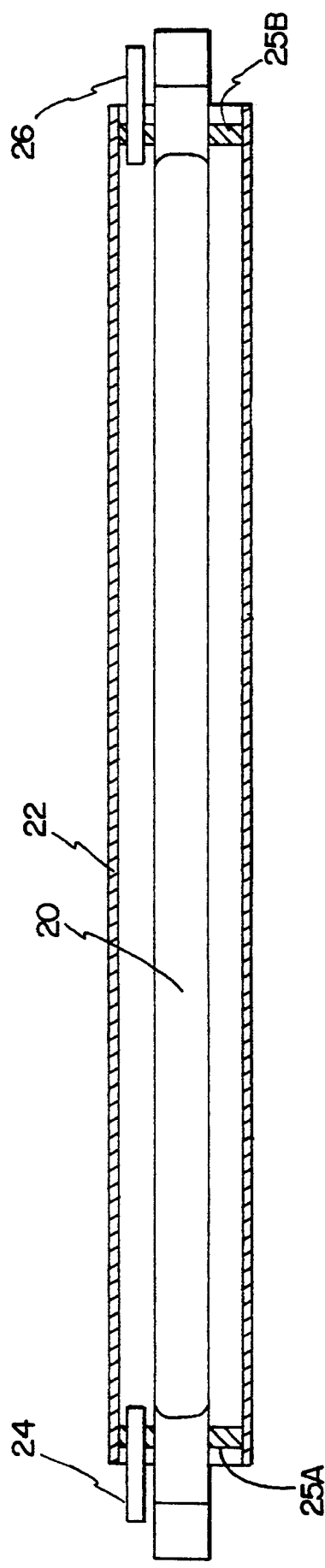
FIG. 4 is a cross-sectional view of a water jacketed quartz halogen lamp used to carry out the method of the present invention.

In order to form a filter for the selected radiator, quartz halogen bulbs were first enclosed in a water jacket as shown in FIG. 4. The quartz halogen bulb 20 was placed inside a 2.54 centimeter outside diameter tube 22 having a wall thickness of 0.16 centimeter and was sealed at each end with a silicone rubber septum 25A, 25B. An inlet connection 24 and outlet connection 26 extending through septums 25A and 25B, respectively were provided to supply and remove water from the water jacket. A small amount of water was pumped through the jacket to maintain the water temperature at about room temperature. It was also found preferable to blow air over the outer surface of the jacket to evaporate condensation. This arrangement was used to conduct many of the tests described below. Although the water jacket filter was found to adequately absorb the unwanted radiation, the arrangement caused premature failure of the bulbs and therefore another filter arrangement was eventually selected as the most preferred filter arrangement.

Figure 5:
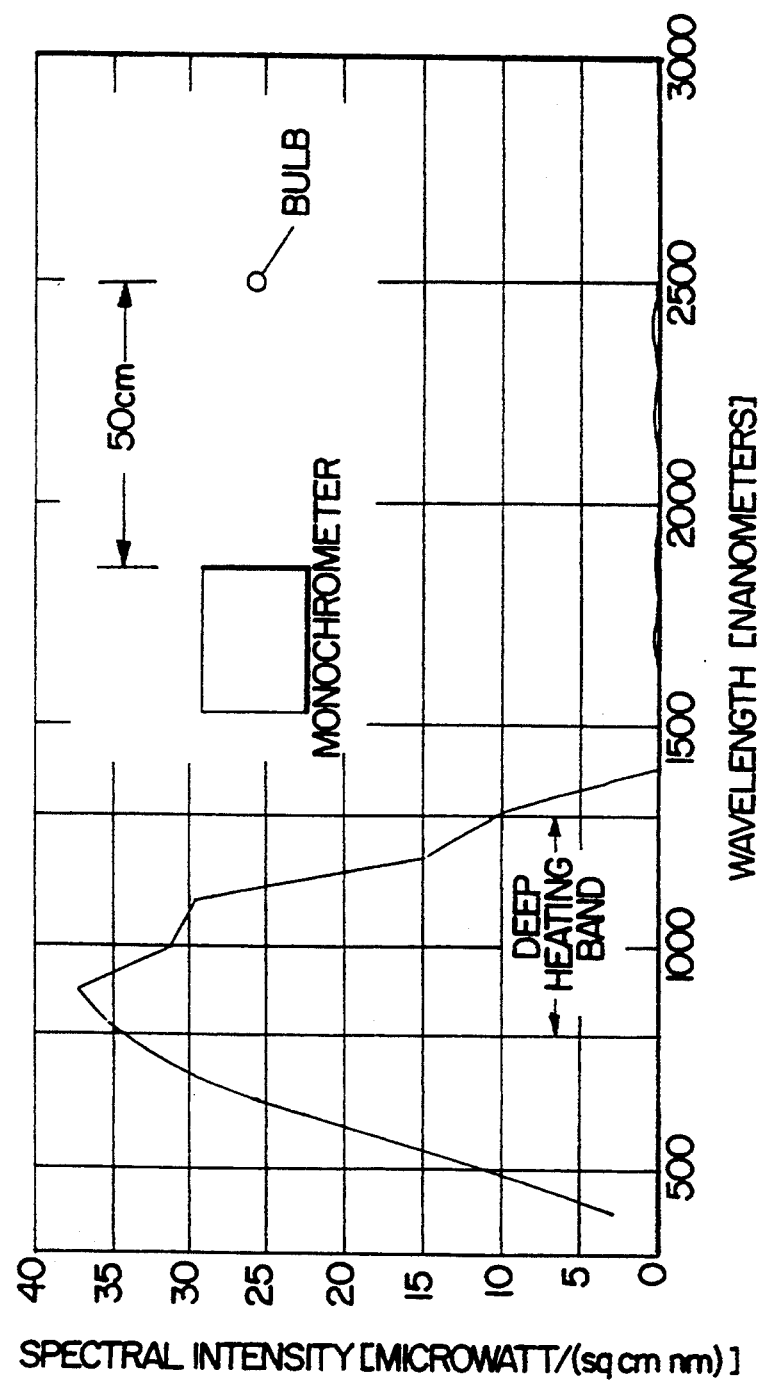
FIG. 5 is a graph showing the spectral intensity of a water jacketed quartz halogen lamp versus wavelength.

FIG. 5 shows the spectral intensity at various wavelengths in the IR range for the above-described water jacketed quartz halogen lamp. As can be seen from this graph, water effectively removes all of the power at the wavelengths above 1,300 nanometers, and removes a majority of the power in the wavelengths above 1,250 nanometers. It can also be seen from FIG. 5 that a water filter does not remove power at wavelengths below 800 nanometers. Removal of power at wavelengths below 800 and above 1,300 nanometers is most preferred.

Figure 6:
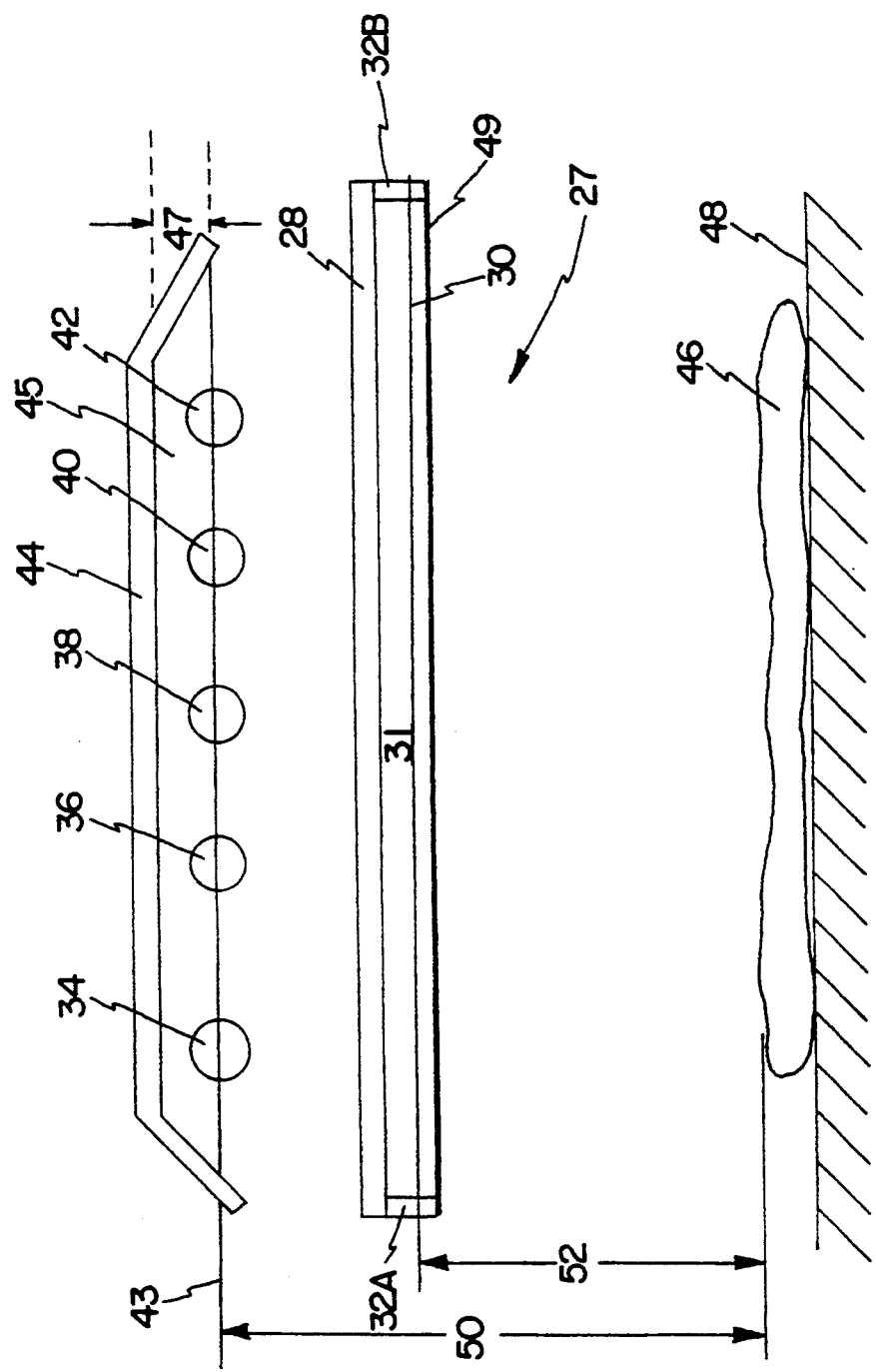
FIG. 6 is a schematic cross-sectional view of an apparatus including five quartz halogen lamps, a reflector and a flat filter located between the lamps and the object to be heated.

The most preferred water filter comprises a flat plate filter 27 as shown in cross-section in FIG. 6 having an upper layer 28 formed of 3.2 millimeter thick glass, and a lower layer 30 formed from a 3.2 millimeter thick sheet of plastic which is transparent to radiation between at least about 800 and about 1,300 nanometers. It has been found that plastics such as polycarbonate and polymethylmethacrylate sheets are suitable for this application. Side walls 32A, 32B seal the upper layer 28 to the lower layer 30. The thickness of the side walls is unimportant. However, the spacing between adjacent inner surfaces of layers 28 and 30 is preferably about 6.6 millimeters. The water filter is therefore about 6.6 millimeters thick.

A water inlet (not shown) and outlet (not shown) are provided. A water supply is provided to maintain the temperature of the water 31 in the filter 27 at about room temperature.

The plate filter 27 is positioned beneath a bank of quartz halogen bulbs 34, 36, 38, 40 and 42 which are horizontally mounted beneath a metal reflector 44 which directs radiation emitted upwardly in a direction toward the dough 46 located on a cooking surface 48. Preferably, an upper surface of the dough 46 is vertically spaced 50 about 48 millimeters from a central axis 43 of each bulb 34, 36, 38, 40 and 42. A lower surface 45 of the reflector 44 is spaced 47 about 25 millimeters from the central axis 43.

A lower surface 49 of the water in the filter 27 is preferably positioned about 22 millimeters designated by numeral 52 from an upper surface of the dough 46.

It is advantageous to place a filter between the bulbs and the food to be cooked because any spattering from the food immediately bakes onto the bulbs at the high operating temperatures. The materials baked onto the bulbs cause premature bulb failure and the baked-on materials are difficult to remove. Baked on materials also are known to ignite. Operating efficiency is also reduced as a result of spattering.

It is preferred to form the lower layer 30 out of plastic because plastic prevents direct contact between the food being processed and any glass equipment, It is highly undesirable in commercial food manufacturing facilities to have glass equipment such as bulbs immediately adjacent to food being processed because of the potential for breakage and food contamination.

Figure 7:
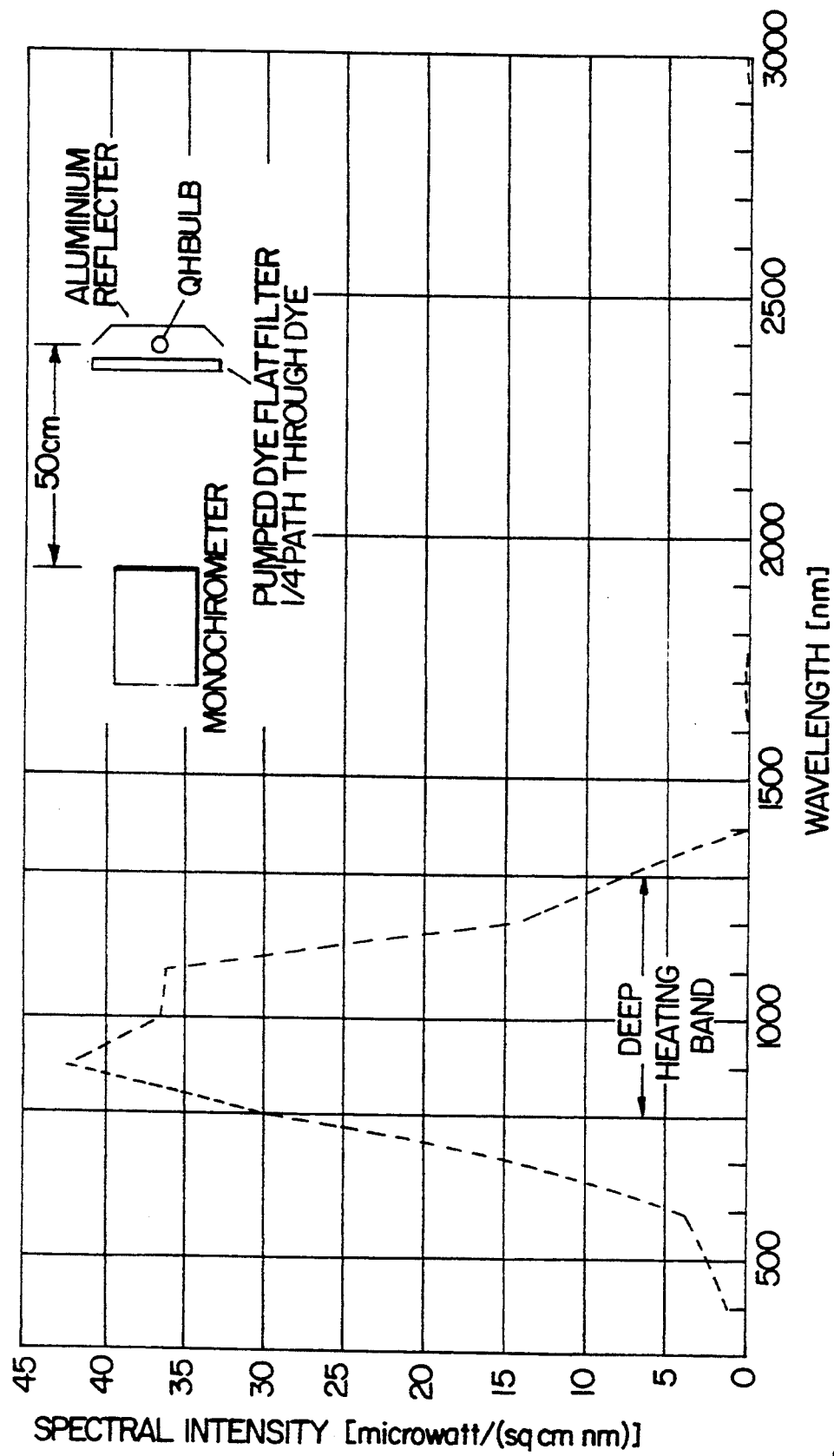
FIG. 7 is a graph of the spectral intensity versus wavelength of a quartz halogen lamp filtered by means of a flat filter containing a dye solution.

Another type of filter was also used to absorb radiation outside the selected band of about 800 to about 1,300 nanometers. A flat filter identical in construction to what is shown in FIG. 6 was studied, except that a dye solution was used rather than water as the filter media. A solution comprising 3.8 grams tannic acid and 1.0 grams of ferrous sulphate dissolved in 12 liters of water was made and pumped continuously through the plate filter 27 shown in FIG. 5. FIG. 7 shows the spectral intensity at a variety of wavelengths for the flat plate dye filter arrangement, using a quartz halogen lamp. As can be seen, the dye filter effectively absorbs all wavelengths above 1,300 nanometers, and additionally absorbs a majority of the wavelengths below about 800 nanometers.

The water is believed to absorb the power at above 1,300 nanometers, while the dye in the water blocks out visible radiation, and IR radiation below 800 nanometers. The area under the curve shown in FIG. 7 which lies between 800 and 1,300 nanometers is approximately 78 percent of the total area under the curve. This illustration shows that by providing a dye filter between a 3,200K radiator and the food being cooked, the percentage of radiated power in the targeted wavelength range of 800 to 1,300 nanometers increases from 35 percent to 78 percent.

Referring back to FIG. 5, the area under the curve which lies between 800 and about 1,300 nanometers is approximately 60% of the total area under the curve. This illustration shows that by providing a water filter between the 3,200K radiator and the food being processed, that the percentage of power in the targeted wavelength range of 800 to 1,300 nanometers increases from 34 percent to about 60 percent over using an unfiltered quartz halogen lamp.

A number of incandescent bulbs with an optical coating designed to remove wavelengths below 800 and above 1,300 nanometers were purchased from Deposition Sciences Incorporated of Santa Rosa, Calif. It was necessary to build a water jacket around the bulbs identical to the arrangement shown in FIG. 4 in order to prevent the optical coating from flaking off. However, with the water jacketing, and using a water flow rate of about 12 gallons per hour, and a power source of 165 volts, 5.7 amps and 29.8 ohms, the coating effectively removed a majority of wavelengths below 800 nanometers and above 1,250 nanometers, as can be seen in the graph of spectral intensity versus wavelength as shown in FIG. 8.

Figure 8:
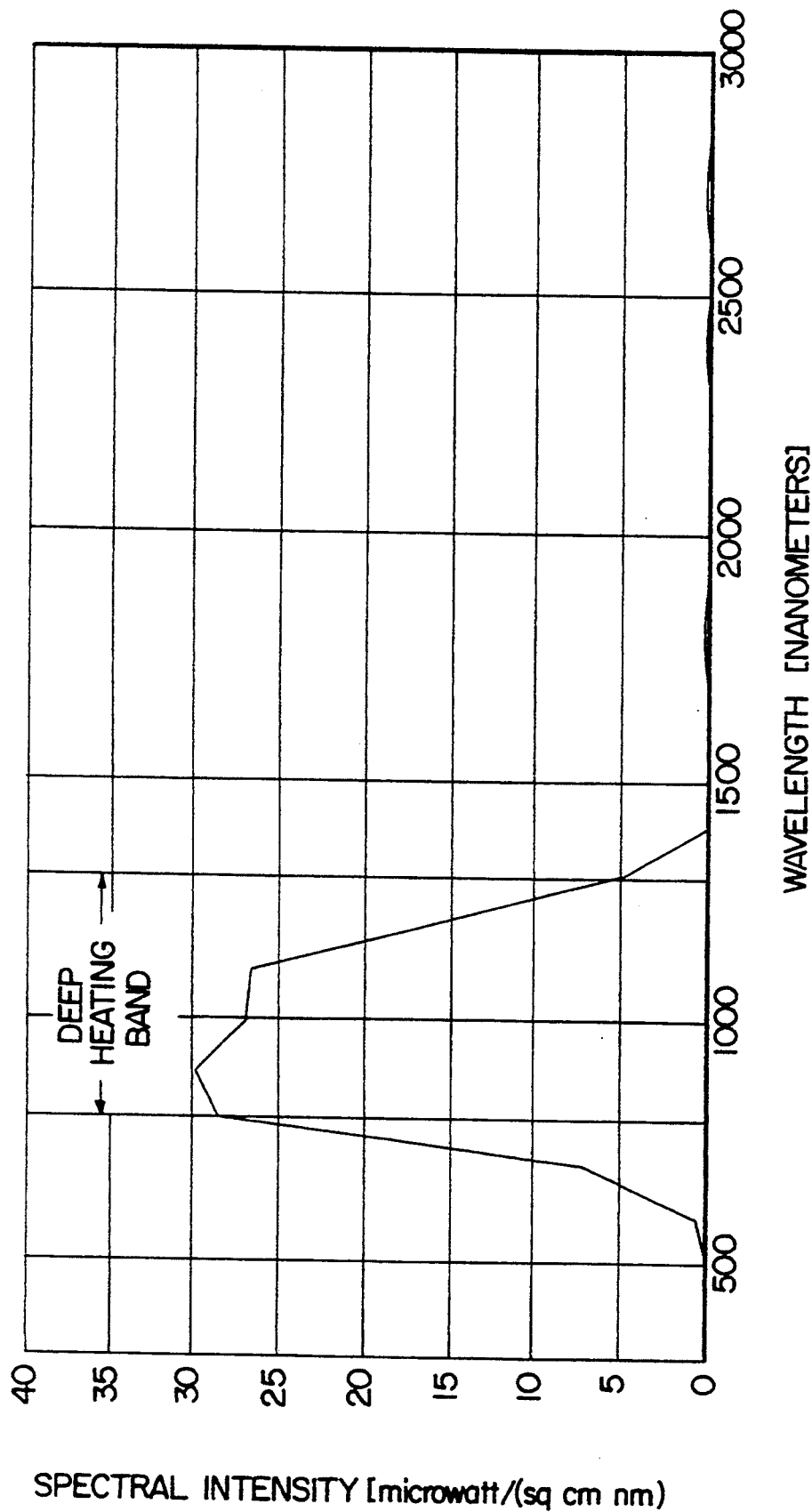
FIG. 8 is a graph of the spectral intensity versus wavelength of a water cooled IR lamp coated with an optical coating.

In comparing the area under the curve shown in FIG. 8 to the area bound between 800 and 1,300 nanometers, the percentage of power delivered to the object to be heated using the lamps with the optical coating was about 83 percent. Unfiltered quartz halogen lamps in comparison delivered only about 35 percent of the total radiation in the desired wavelength range.

It is believed that more heat resistant coatings could be developed which filter out or reflect back to the filament unwanted radiation without the need for cooling with a water jacket. The optical coating can be obtained by specifying the wavelength range to be transmitted.

As mentioned in the background section, radiation between about 800 and 1,300 nanometers is capable of heating below the surface of white bread crumb. However, the penetration depth as measured by persons skilled in the art is no greater than about 0.5 centimeters (shown in FIG. 2). However, the penetration depth does vary with wavelength.

Referring back to FIG. 2, in the wavelength range of 800 to 1,300 nanometers, the penetration depth for white bread crumb varies between 0.28 and 0.47 centimeters. It can also be seen from this Figure that at above 2,000 nanometers, the penetration depth is no greater than 0.14 centimeters, which indicates that only surface heating occurs at wavelengths above 2,000 nanometers for bread crumb.

The relatively shallow penetration depth is an inherent limitation of the use of IR radiation for baking, and as a result, this type of processing is most applicable to products having a thickness of about 3 centimeters or less, such as cookies, pizza crusts, pizza snacks, toaster pastries and the like. Thicker products could be also prepared according to the method of the present invention, but the mechanism of heating would at least in part be due to conduction, which would significantly lengthen cooking times.

In order to further demonstrate the advantages of the method of the present invention, the following examples are provided which in no means are intended to limit the scope of the present invention.

Example I

A refrigerated dough product described in Atwell U.S. Pat. No. 4,526,801 was formed according to the following formulation:

| Ingredient | Weight % |
|---|---|
| wheat flour | 52.00–56.00 |
| water | 28.00–36.00 |
| saccharides | 4.00–8.00 |
| salt | 1.00–1.50 |
| shortening | 3.00–6.00 |
| flavor | 2.00–7.00 |
| emulsifiers | 0.02–0.30 |
| dough conditioners | 0.005–0.02 |
| bicarbonate of soda | 0.70–1.20 |
| edible alcohol | 0.00–2.00 |
| calcium carbonate | 0.00–1.00 |
| | 100.00 |

Atwell U.S. Pat. No. 4,526,801 is hereby incorporated by reference. The dough was placed beneath a bank of five water jacketed quartz halogen lamps on 2.54 centimeter centers and the power of each lamp was adjusted to 1,500 watts in order to determine if filtered IR radiation could be used to proof dough more rapidly than with conventional proofing techniques. The apparatus used to run the test and the placement of the dough in relation to the filter and lamps is shown in FIG. 6. The dough was at room temperature at the start of the experiment.

The dough was formed into a sheet of about 1.26 centimeters in thickness and exposed to the filtered IR radiation for 15', 30, 45 and 60 seconds, respectively. It was the object of this experiment to raise the internal dough temperature to about 85 Fahrenheit to commence proofing. After heating, each dough sheet was placed in a can and capped. Progress of proofing was monitored by means known in the art. The cans were stored at room temperature until they were full.

The samples heated for one minute were fully proofed in less than 45 minutes. Control samples proofed at room temperature in 4 hours. Samples heated for 30 seconds proofed in 3 hours, as did the two samples heated for 45 seconds. The dough proofed by means of IR radiation was free of browning.

The results show that filtered IR radiation which preferentially delivers radiation at wavelengths below 1,300 nanometers is sufficient to activate the leavener and is effective to proof dough without compromising product quality. The proofing times as compared to conventional proofing methods are substantially reduced.

Subsequent studies showed that proofing time may be reduced by a factor of two, and in one case by a factor of 7.

Example II

Heating of dough using IR radiation filtered by means of the water jacket described above was compared to heating with non-filtered IR radiation. The quartz halogen bulb arrangement shown in FIG. 6 was used as the radiator for generating both sets of data. Dough formed from 600 grams of flour, 360 grams of water, and no leavening was used to run the test. Samples of uniform size and mass were used for the comparison. Each dough segment was 12.9 centimeters square and weighed 8 grams.

An oil bath calorimeter was used to measure the total amount of energy delivered to each sample. The distance between the dough surface and a centerline of the bulb was adjusted in each case to equalize the power delivered to both samples.

The conventional quartz halogen lamp browned the samples in 75 seconds. The water filtered quartz halogen lamp did not brown the samples after 180 seconds, but thoroughly cooked the samples. Since the samples were fully cooked at 180 seconds, the lamps were turned off. Samples cooked with the conventional quartz halogen lamp lost 3 percent of their initial mass, while the samples cooked by the water filtered lamps lost 18 percent of their initial mass without browning.

The results show that between 2 and 2-½ times the energy can be delivered to a dough without browning when using filtered IR radiation as compared to conventional IR radiation. The results also show that filtered IR radiation shows promise for drying processes.

Example III

In this experiment, the use of filtered IR radiation to enhance product quality by suppressing microbial growth was tested by comparing Pillsbury Pizza Rolls ™ cooked by conventional deep frying to Pizza Rolls ™ which were precooked by means of IR radiation and fried in a lower temperature oil in a subsequent process step.

Pizza dough as described in Totino et al. U.S. Pat. No. 4,170,659 was formed according to the following formula:

| Dough | |
|---|---|
| Ingredient | Weight % |
| wheat flour | 60.65 |
| water | 36.04 |
| yeast | 1.28 |
| Salt | 0.93 |
| Dough conditioner (sodium stearoyl 2 lactylate, e.g. Reduce ™ by Patco Co., Kansas City, Mo. | 0.30 |
| soy oil | 0.80 |
| | 100.00 |

Totino et al. U.S. Pat. No. 4,170,659 is herein incorporated by reference. The dough was prepared according to the formula described above and formed into a dough sheet. The dough was rolled into a sheet of approximately 5 millimeters thickness. The sheet was cut into pieces, and stuffed with a filling having the following composition:

| Filling | |
|---|---|
| Ingredient | Weight % |
| pizza roll sauce | 34.63 |
| sausage blend | 27.19 |
| mozzarella cheese | 14.08 |
| water | 9.58 |
| pepperoni | 8.03 |
| sweet peppers | 2.50 |
| white onion, dehydrated | 2.64 |
| flour | 1.35 |
| | 100.00 |

The filling was sealed within the cut pieces of dough, and the product was exposed to IR radiation emitted from a quartz halogen lamp with a tungsten filament, and filtered by means of the water jacket filter described above.

When Pizza Rolls ™ are cooked by means of deep fat frying, the oil temperature must be maintained at about 400 F. so that after about 45 seconds of cooking time, when the outer surfaces of the product are browned, the inner filling reaches a minimum temperature of about 126 F. to prevent microbial growth.

It was discovered that by first exposing the Pizza Rolls ™ to water filtered quartz halogen radiation as described above, that the temperature of the inner filling can be raised to about 126° F. in about 60 seconds. Oil temperatures of as low as 375° F. were found to adequately fry the Pizza Rolls ™ in about 30 seconds. The fat content of the final product that was precooked by means of filtered IR radiation had 12% less fat than the Pizza Rolls ™ cooked by conventional deep fat frying.

Example IV

Pillsbury Toaster Strudel ™ is currently cooked by means of deep fat frying. Current fry time is about 45 seconds. This product is described in detail in Wallin et al. U.S. Pat. No. 4,612,198 which is herein incorporated by reference.

In order to compare the qualities and cooking times of Toaster Strudel™ conventionally fried, and cooked by means of filtered IR radiation, a Toaster Strudel ™ dough was first formed according to the following formula:

| Toaster Strudel ™ | |
|---|---|
| Ingredient | Weight % |
| flour, hard wheat enriched | 52.51 |
| water | 35.51 |
| vegetable shortening hydrogenated | 2.50 |
| flour, unbleached soft wheat | 2.10 |
| sugar | 1.75 |
| egg yolk solids | 1.70 |
| active dry yeast | 1.50 |
| salt, medium fine | 1.04 |
| dextrose | 0.50 |
| butter flavor emulsion | 0.25 |
| SAPP* | 0.25 |
| bicarbonate of soda | 0.25 |
| mono and diglyerides all vegetable | 0.10 |
| yellow color 17179 | 0.04 |
| | 100.00 |

*SAPP is Sodium acid pyrophosphate

A known filling of 20% fruit puree '20, 10% corn syrup, 5% modified starch, 0.2% gum, 42% sugar, 21% water, 1.2% citric acid, 0.50% sodium citrate and 0.1% preservatives was placed between two pieces of Toaster Strudel ™ dough. The preferred dough squares are about 7.60 centimeters by about 12.7 centimeters by about 0.5 centimeters thick. The dough squares were sealed at the edges to prevent the filling from escaping during cooking.

The Toaster Strudel ™ was exposed to water jacketed quartz halogen bulbs for 45 seconds per side. After the interior of the dough was heated by means of filtered IR radiation, the product was sprayed with vegetable oil, and then allowed to drip for sixty seconds to remove residual surface oil. Each side of the product was exposed to radiation from conventional infrared heaters for about 20 additional seconds to brown the exterior surfaces.

The results show that the fat content of the product was significantly reduced, while the textural and taste properties of the product were improved. The fat content of a conventionally fried Toaster Strudel ™ is about 13.5% while the fat content of the IR fried Toaster Strudel ™ was about 7%.

Furthermore, by using filtered IR radiation to proof the Toaster Strudel ™ dough, the total processing time may be reduced below that required for conventional proofing and conventional frying.

Example V

Cooking times for preparing Toaster Strudel ™ by means of filtered IR radiation was compared to cooking times for preparing Toaster Strudel ™ by means of jet impingement baking, steam baking and conventional baking.

A Toaster Strudel ™ product identical to that described in Example IV was processed using filtered IR radiation in the range of 600–1,300 nanometers. The Toaster Strudel ™ product was prepared and baked after proofing for 45 seconds per side to complete the cooking process.

The resulting product was fully cooked without surface browning and was ready for frozen storage and subsequent browning by the consumer in a conventional toaster or oven..

Jet impingement baking required five minutes baking time after proofing, as compared to 45 seconds baking time using two oppositely spaced banks of filtered IR radiators. Even if the product is exposed to filtered IR radiation only one side at a time, the time savings over jet impingement baking is still substantial. In comparison, conventional baking required 7 minutes of baking time, and steam baking required 6–7 minutes baking time.

Example VI

The inventors further tested their theory of deep heating by means of exposing a food product to IR radiation between about 800 and about 1,300 nanometers by placing a layer of black absorbing paper between two pieces of bread and heating the sandwiches for a period of 45 seconds. One sandwich was heated with an unfiltered quartz halogen lamp running at 1,500 watts and delivering power at a peak wavelength of about 1,000 nanometers, and the other sandwich was heated with the same lamp equipped with a water filter. It was demonstrated that the interior surfaces of the bread in contact with the black paper could be browned without causing the outer surfaces to brown when using filtered IR radiation. In contrast, the surface of the bread nearest the unfiltered IR radiation source browned.

Example VII

Figure 9:
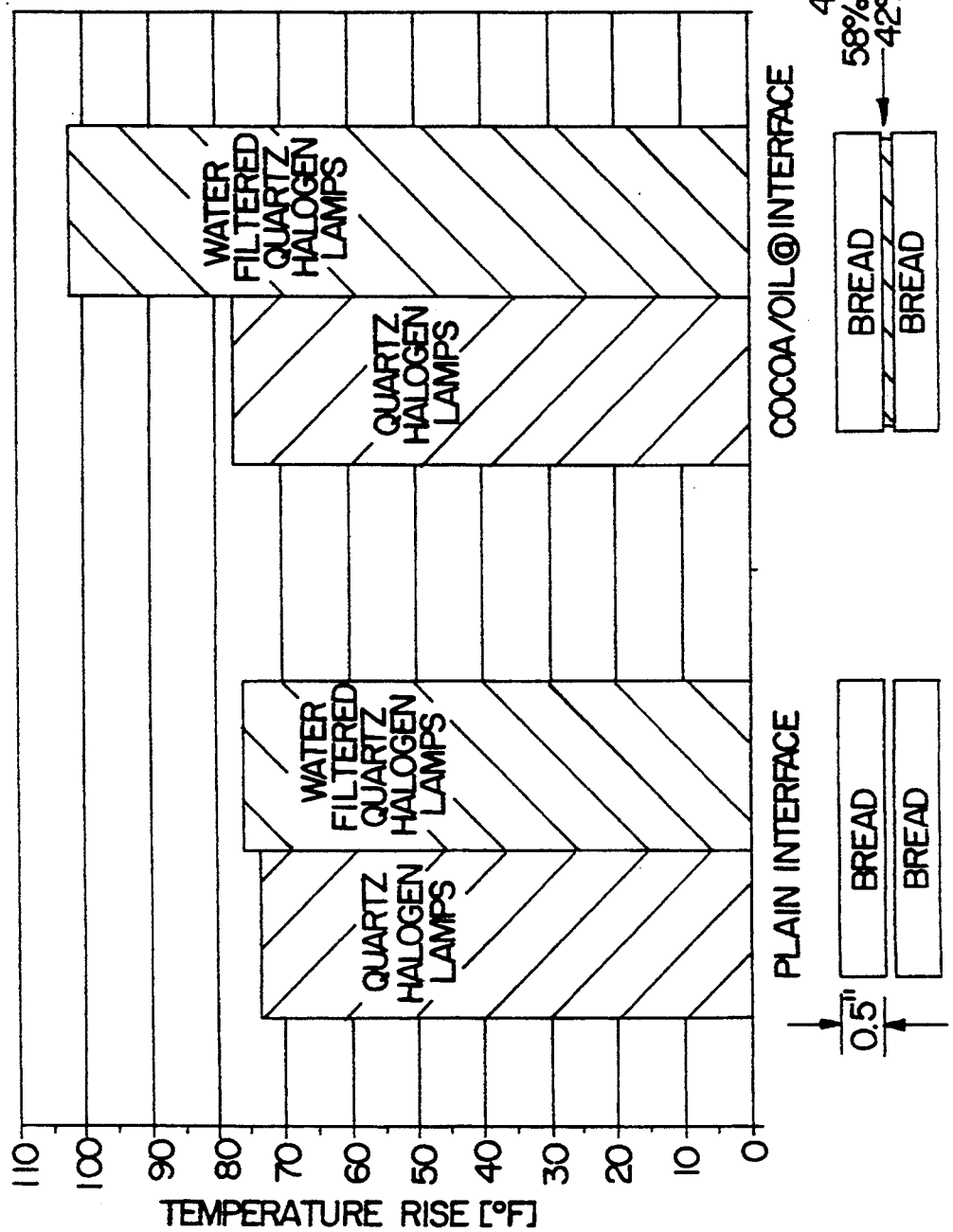
FIG. 9 is a graph of the temperature rise at the interface between bread slices after 45 seconds of heating with and without a cocoa/oil mix at the interface for two different infrared sources.

To further illustrate the heating process of the present invention, a quantitative measurement of the effect of different infrared sources was made by observing the temperature rise at the center of a sandwich with and without an infrared absorber present as shown in FIG. 9. A cocoa/oil mix was used as the infrared absorbing layer. Source to sandwich distances and exposure times were adjusted so that the temperature rise at the bread to bread interface without the absorber present was nearly 70° F. for each source. The interface temperatures were measured by inserting thermocouple probes immediately after the infrared sources were turned off at the end of heating. About 45 seconds were required to attain a 70° F. of temperature rise.

The temperature rise at the interface between the bread slices with and without the cocoa/oil absorber present is shown in FIG. 9. With conventional quartz halogen lamp heaters, the addition of the absorber increased the temperature less than 5° F. With the water filtered lamps, the temperature profile changed. The interface temperature increased 25° F. indicating that more infrared energy penetrated through the bread slice to the absorbing layer when the water filtered lamps were used.

Although only dough based products are described above, the present invention is not limited to heating dough based products. For example, hot fudge may be heated through a layer of frozen ice cream by means of IR radiation with wavelengths of 1,300 nanometers and above removed by means of a filter without adversely affecting the ice cream.

The present invention has wide applicability to a variety of heating processes including, but not limited to drying, thawing, proofing, cooking, preheating, warming and suppression of microbial growth.

Although the present invention has been described with reference to preferred embodiments, workers skilled in the art will recognize that changes may be made in form and detail without departing from the spirit and scope of the invention.

What is claimed is:

1. A method of selectively heating food, comprising:
   selecting a filtered source of radiation suitable for deep heating food, wherein at least 60% of the total power is delivered in a selected wavelength band capable of deep heating; and
   exposing the food to the radiation for a time sufficient to heat an interior of the food to a selected temperature.

2. The method of claim 1 wherein a maximum of the selected wavelength band is about 1,300 nanometers.

3. The method of claim 1 wherein a minimum wavelength band is about 800 nanometers.

4. The method of claim 1 wherein the food is dough and the dough is exposed to radiation to proof the dough.

5. The method of claim 1 and further comprising the step of frying the dough after exposure to radiation.

6. The method of claim 1 and further comprising the step of exposing the food to unfiltered IR radiation.

7. A method of preparing a food product, comprising:
   precooking the food by means of exposure to filtered IR radiation, wherein the radiation is suitable for deep heating food, wherein at least 60% of the total power is delivered in a selected wavelength band capable of deep heating;
   applying oil to at least one outer surface of the precooked product; and
   exposing the food to unfiltered IR radiation for an amount of time sufficient to brown the food.

8. A method of precooking an inner portion of a food product, comprising:
   exposing the food product to filtered IR radiation, at least 60% of the radiation having a wavelength below about 1,300 nanometers, for a time sufficient to heat the inner portion of the food product to a selected temperature, thereby precooking the inner portion of the food product.

9. The method of claim 7 wherein the product being precooked is a dough product including a filling material.

10. A method of proofing dough containing leavener, the method comprising:
    exposing the dough to IR radiation having a wavelength range below about 1,300 nanometers for an amount of time sufficient to activate the leavener, thereby proofing the dough.

11. The method of claim 10 and further comprising the step of sealing the dough in a container for an amount of time sufficient for the dough to develop.

12. The method of claim 10 wherein the IR radiation has a minimum wavelength of about 800 nanometers.

13. The method of claim 1 wherein the temperature is selected to inhibit microbial growth.

* * * * *